(12) United States Patent
Wobben

(10) Patent No.: US 6,803,671 B1
(45) Date of Patent: Oct. 12, 2004

(54) SYNCHRONOUS MACHINE

(76) Inventor: Aloys Wobben, Argestrasse 19, D-26607 Aurich (DE)

( * ) Notice: Subject to any disclaimer, the term of this patent is extended or adjusted under 35 U.S.C. 154(b) by 0 days.

(21) Appl. No.: 09/979,790

(22) PCT Filed: Mar. 3, 2000

(86) PCT No.: PCT/EP00/01882
§ 371 (c)(1),
(2), (4) Date: Mar. 4, 2002

(87) PCT Pub. No.: WO00/74210
PCT Pub. Date: Dec. 7, 2000

(30) Foreign Application Priority Data

May 26, 1999 (DE) ......................................... 199 23 925

(51) Int. Cl.⁷ .............................. H02K 3/28; F03D 9/00
(52) U.S. Cl. ......................................... 290/55; 310/184
(58) Field of Search ........................... 290/55; 310/179, 310/184, 180, 181

(56) References Cited

U.S. PATENT DOCUMENTS 4,318,019 A    3/1982  Teasley et al. .............. 310/156
4,550,267 A *  10/1985 Vaidya ........................ 310/184
5,929,549 A *  7/1999  Trago et al. ................. 310/198

FOREIGN PATENT DOCUMENTS

DE       19729034 A1    1/1999
WO       WO 88/07782   10/1988

* cited by examiner

Primary Examiner—Burton Mullins
(74) Attorney, Agent, or Firm—Seed IP Law Group PLLC

(57) ABSTRACT

Synchronous machines have long been known in many different forms. In operation as a generator and also in operation as a motor, in the situation of a short-circuit, for example a short-circuit at connecting terminals or also within the stator winding, such synchronous machines produce very high short-circuit torques. In that respect, those very high short-circuit torque peaks can reach values of up to six to eight times the rated torque of the synchronous machine. Therefore, consideration must also be given to the very rare short-circuit situation and the concomitant occurrence of a very high short-circuit torque, in regard to the mechanical construction of the synchronous machine.

10 Claims, 10 Drawing Sheets

SYNCHRONOUS MACHINE

BACKGROUND OF THE INVENTION

1. Field of the Invention

Figure 1:
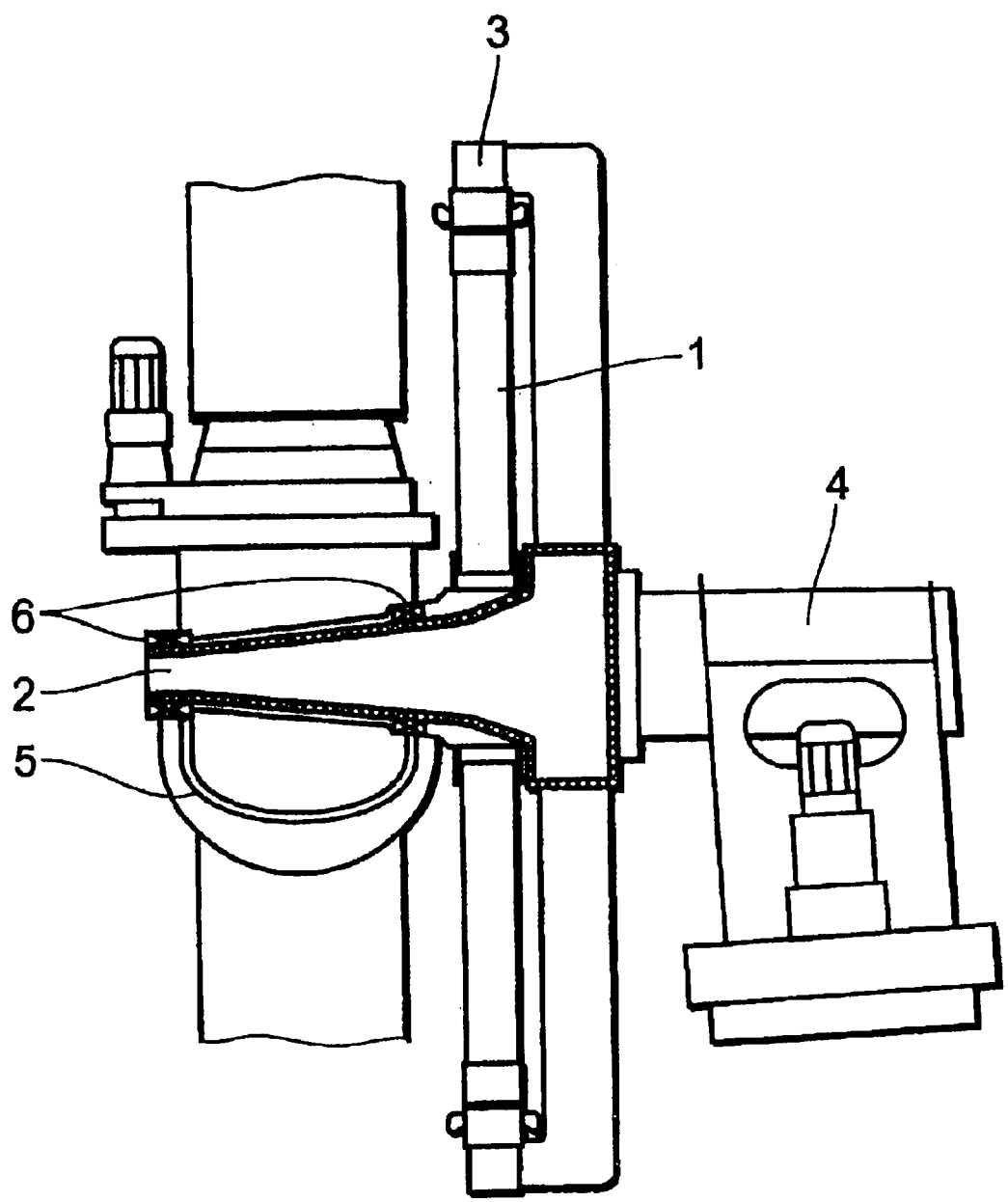

Synchronous machines have long been known in many different forms. In operation as a generator and also in operation as a motor, in the situation of a short-circuit, for example a short-circuit at connecting terminals or also within the stator winding, such synchronous machines produce very high short-circuit torques. In that respect, those very high short-circuit torque peaks can reach values of up to six to eight times the rated torque of the synchronous machine. Therefore, consideration must also be given to the very rare short-circuit situation and the concomitant occurrence of a very high short-circuit torque, in regard to the mechanical construction of the synchronous machine.

2. Description of the Related Art

Synchronous machines of the above-described kind have already long been used in wind power installations from the company Enercon. In those types of wind power installations, the synchronous machines are in the form of ring generators, wherein the generator rotor rotates within the generator stator and the generator rotor is mounted by a flange mounting directly to the rotor of the wind power installation. In the case of a generator rotor which is directly mounted by a flange mounting to a drive machine, very high short-circuit torques occur in a short-circuit situation and the constructions are linked to very high cost levels and a very high level of maintenance, in order to avoid major damage.

Therefore, in a synchronous machine as is used for example in the wind power installation of type E-40 from Enercon, a mechanical safety device in the form of a shearing pin coupling was developed and used therein. In that case the so-called stator carrier star or spider (carrier) which carries the stator (stationary member of the generator) is connected by way of shearing pins to the axle journal or stub axle which is also stationary. In the event of a generator short-circuit, the pins shear and permit the stator also to rotate about the axle journal. In that way the transmitted torque is limited to a maximum of four times the rated torque and the drive train is guaranteed to be safeguarded in a generator short-circuit situation.

DE 197 29 034 discloses a wind power installation with a synchronous generator which has a generator stator with a stator winding and a generator rotor which is movable relative to the stator. In one embodiment the stator there has a 6-phase stator winding. The 6 phases of the synchronous generator are connected to a common rectifier circuit.

WO 88/07782 discloses a wind power installation with an electrical generator having a rotor and a stator. The stator there has a plurality of turns which can be connected together in different ways by suitable switching means in order to produce a desired output signal.

DE 40 32 492 discloses an electrical machine for power converter operation comprising a multi-phase stator winding which can be switched over, that can also be used in a wind power installation. The stator winding in that case is subdivided into similar, respectively m-phase winding sub-systems which are galvanically separated and fixedly connected in a star or polygon configuration. Special switching elements are provided for switching over the winding.

BRIEF SUMMARY OF THE INVENTION

The object of the invention is to simplify the synchronous machine in regard to its structure and to avoid the above-mentioned disadvantages.

In accordance with the invention that object is attained by a synchronous machine having the feature set forth in claim 1. Advantageous developments are described in the further claims.

The invention is based on the realisation that particular safety elements such for example a shearing pin coupling are not necessary if the maximum short-circuit torque is limited to a fraction of that which is hitherto usual. Preferably, in the synchronous machine according to the invention, the short-circuit torque is always less than double the torque.

For limiting the short-circuit torque the rotor has at least two independent three-phase windings which are electrically and/or spatially isolated from each other. That provides that the power of the generator is divided to two different three-phase systems. With two independent three-phase systems, each system involves only 50% of the rated power. Those systems are displaced through an angle of 30°. This means that both three-phase systems are electrically and mechanically (spatially) isolated. In that way however the reactance $X_d$ is also approximately doubled and thus the short-circuit current is halved. This affords the particular advantage that, in the event of a short-circuit in a system, only half the short-circuit power can occur. It is thus possible to have a reduction in the maximum short-circuit moment (short-circuiting of two phases, for example U1 and V1) by 50% relative to the hitherto usual single-system arrangement.

Another measure for reducing the short-circuit torque is to eliminate a damper cage, especially as the reactances $X_d''$ and $X_d'$ determine the dynamic short-circuit current configuration. The maximum short-circuit torque can be reduced by about 30% by virtue of the omission of the damper cage, that is to say by virtue of the use of a salient-pole machine without damper winding.

As a further measure for reducing the torque involved, it is proposed that the pole heads of the rotor are of an approximately arrow-shaped configuration. In the case of a short-circuit in one of the two three-phase systems the magnetic flux in the exciter pole can then very rapidly deflect in the direction of rotation. That affords soft dynamic decoupling of the exciter flux with the stator flux within a groove. Per pole width, the short-circuit current then flows only in two of a total of six grooves. That dynamic decoupling of the exciter flux still further reduces the short-circuit torque.

The invention will be described in greater detail hereinafter by means of an embodiment illustrated in the drawings in which:

BRIEF DESCRIPTION OF THE SEVERAL VIEWS OF THE DRAWING(S)

Figure 2:
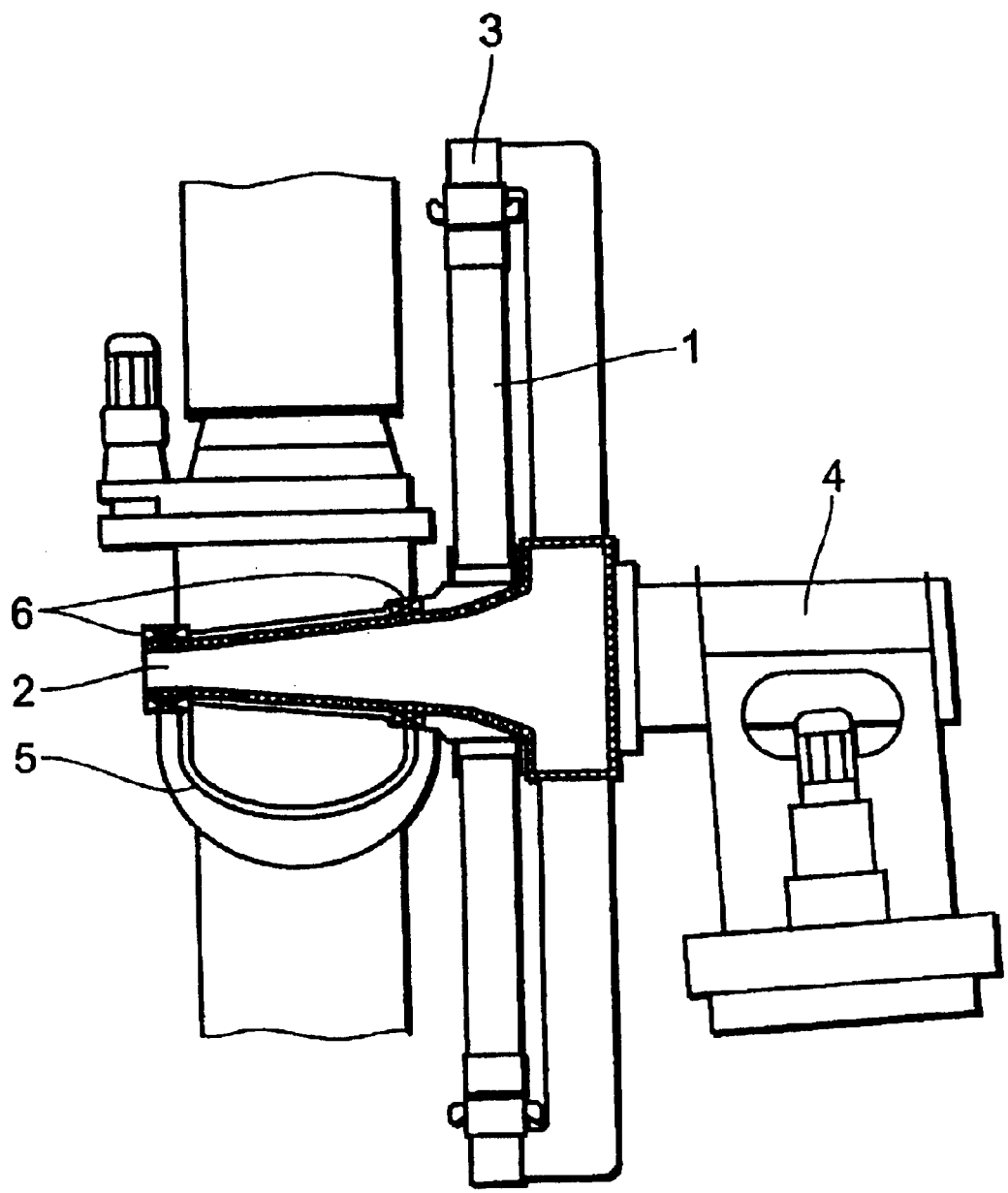
Figure 3A:
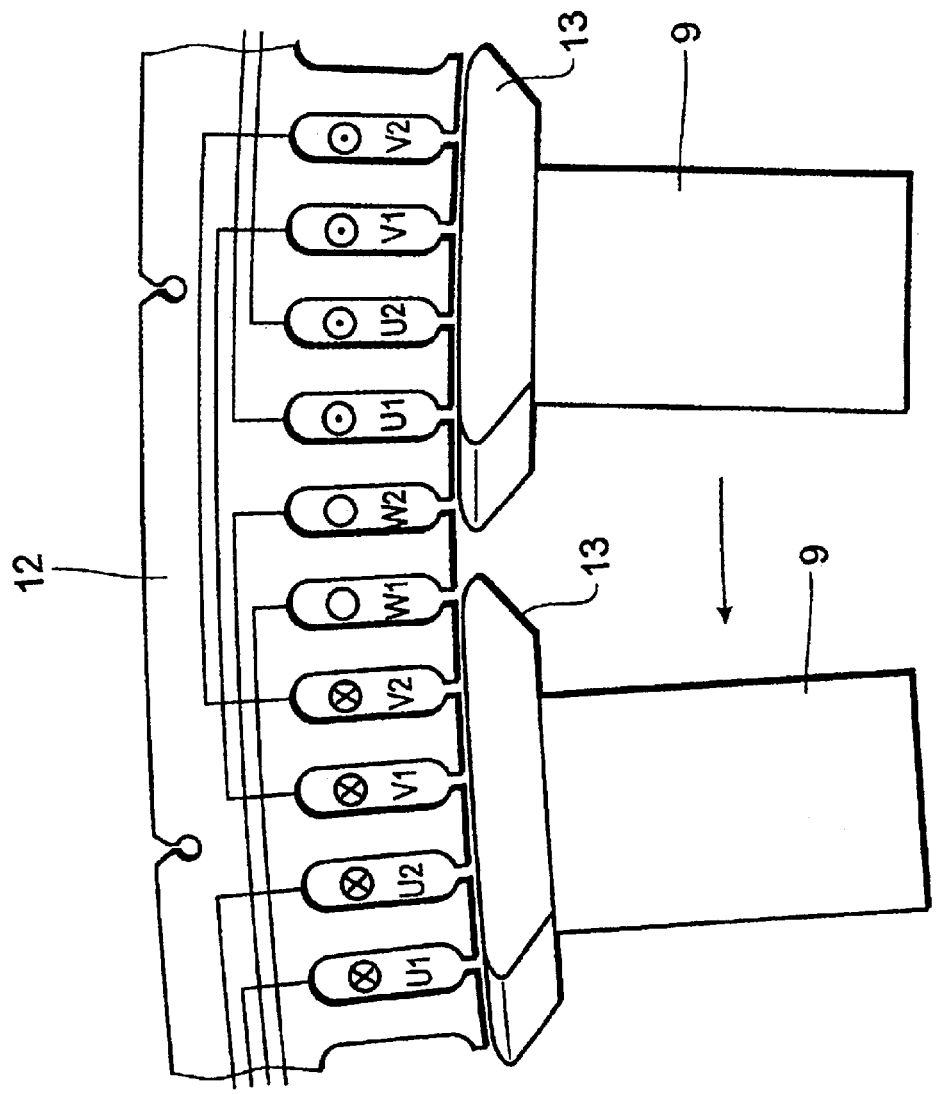
Figure 3B:
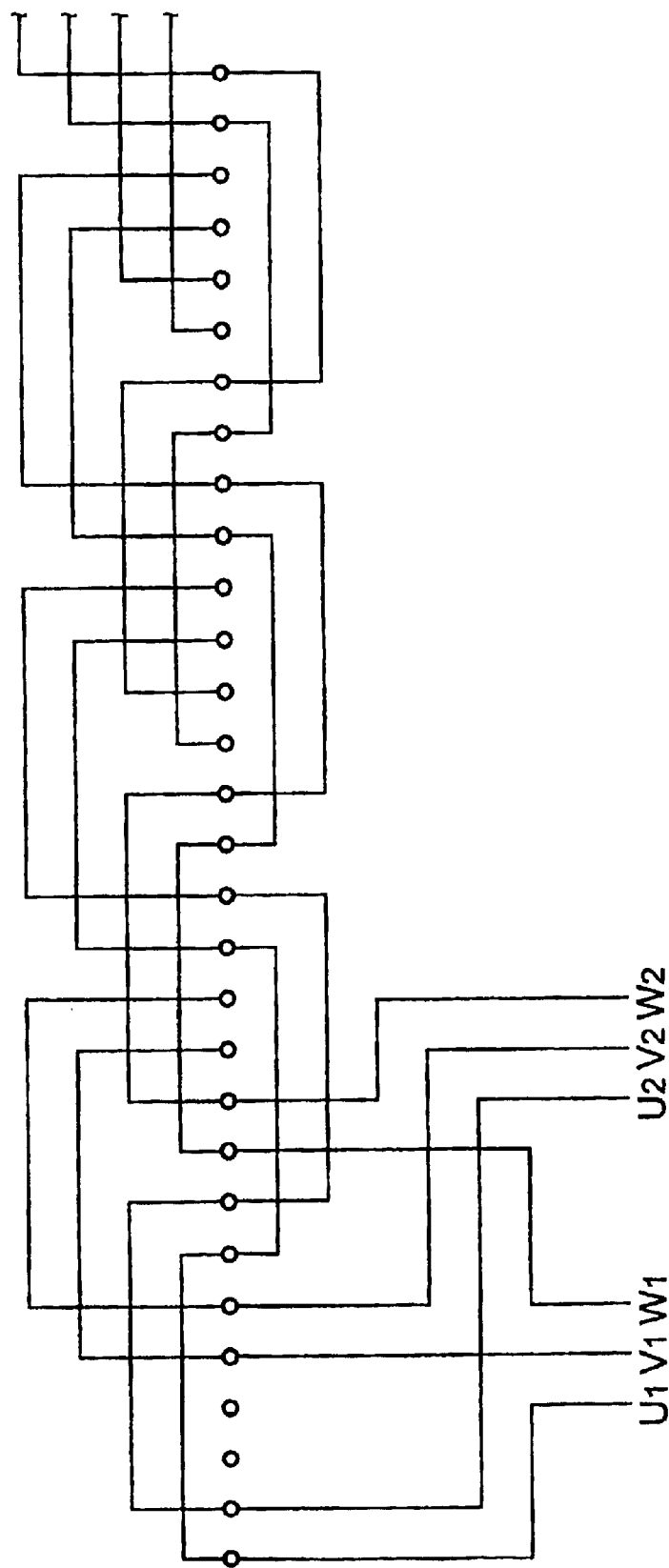
Figure 3C:
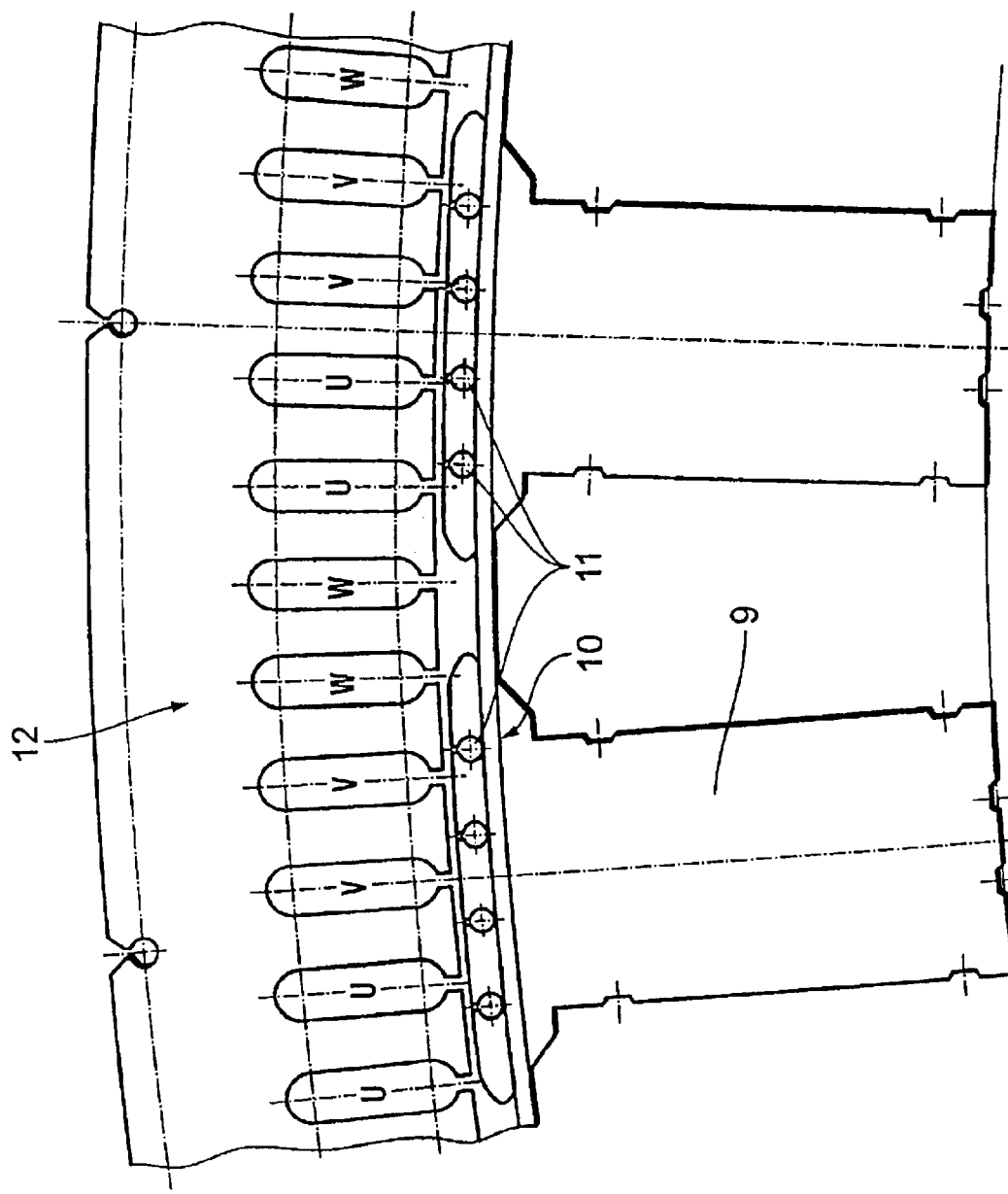
Figure 4A:
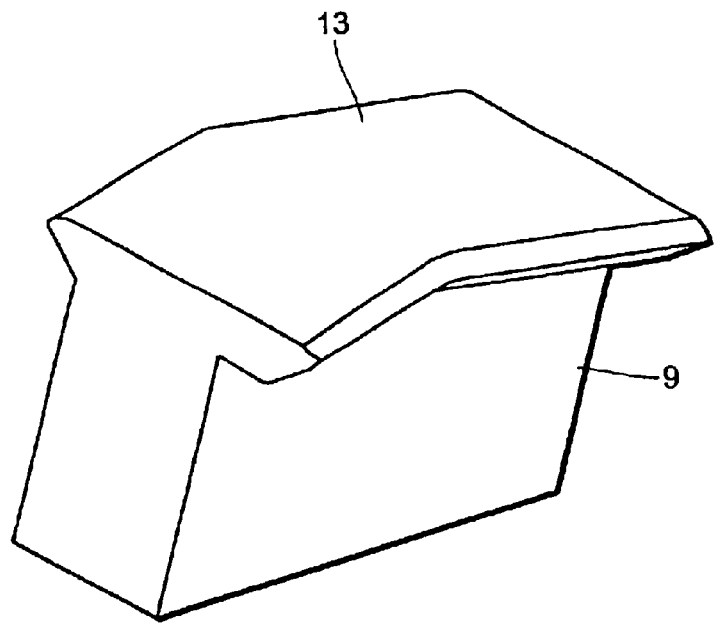
Figure 4B:
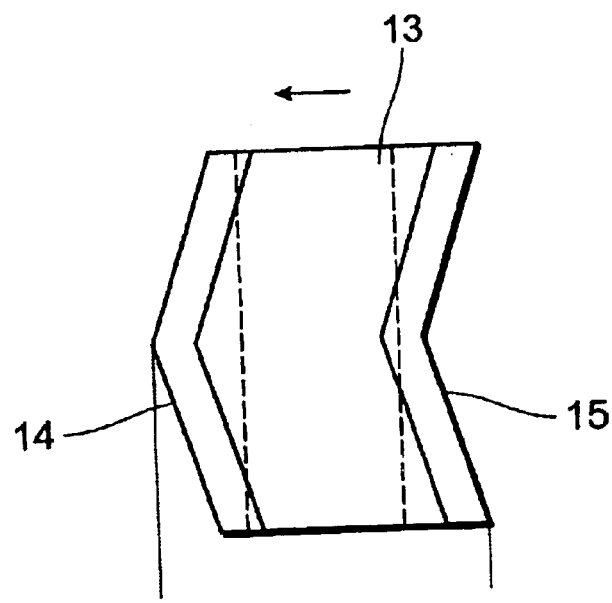
Figure 5:
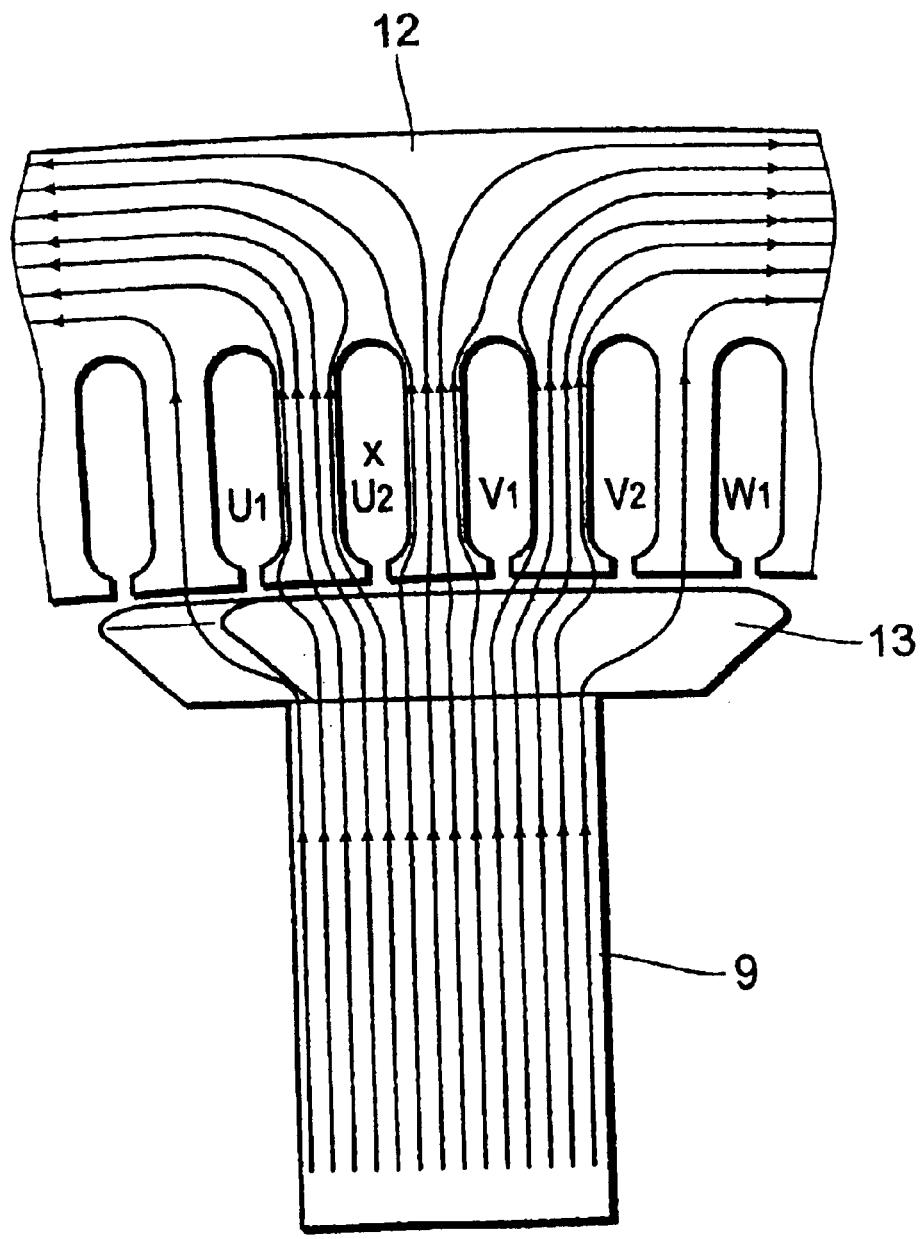
Figure 6:
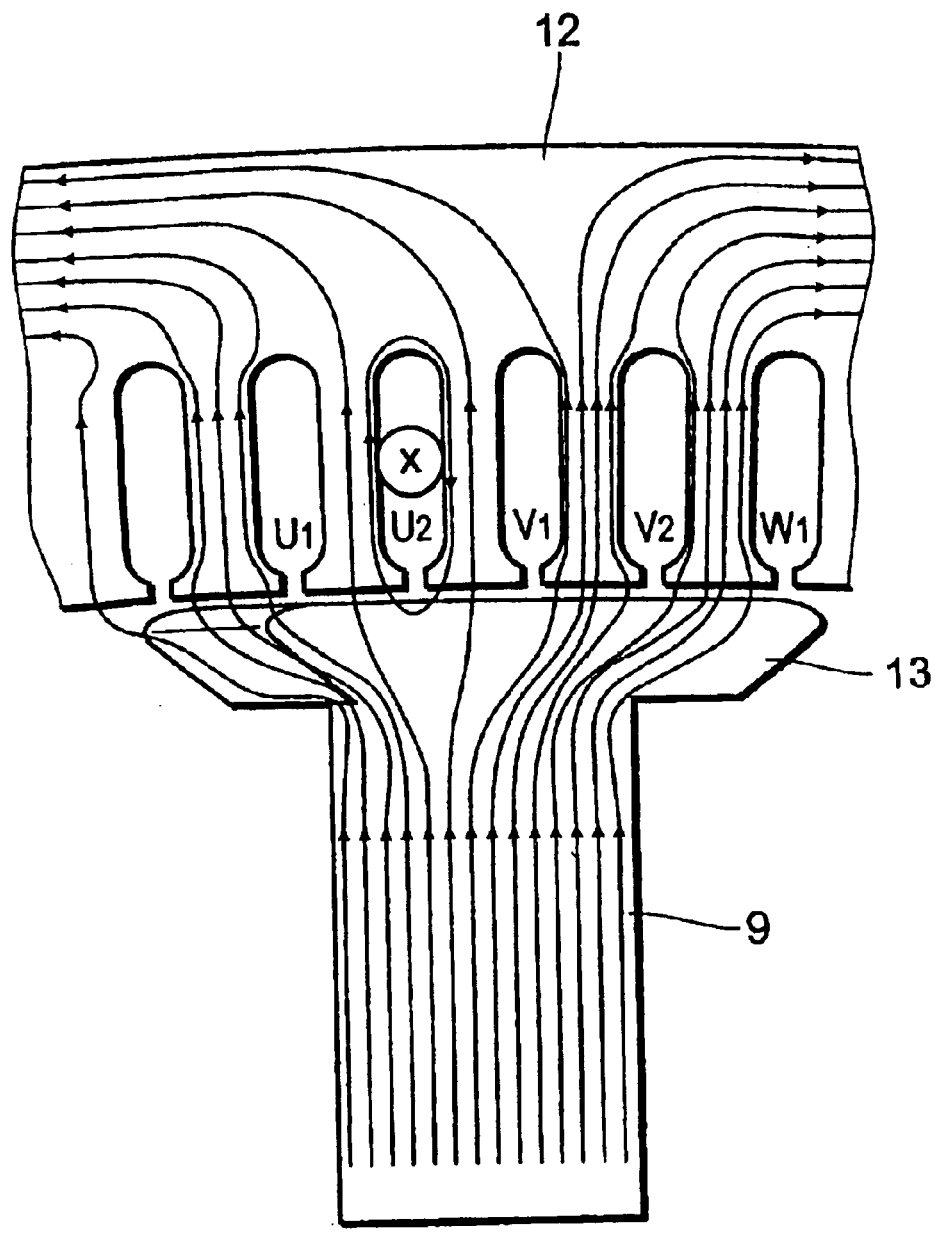
Figure 7:
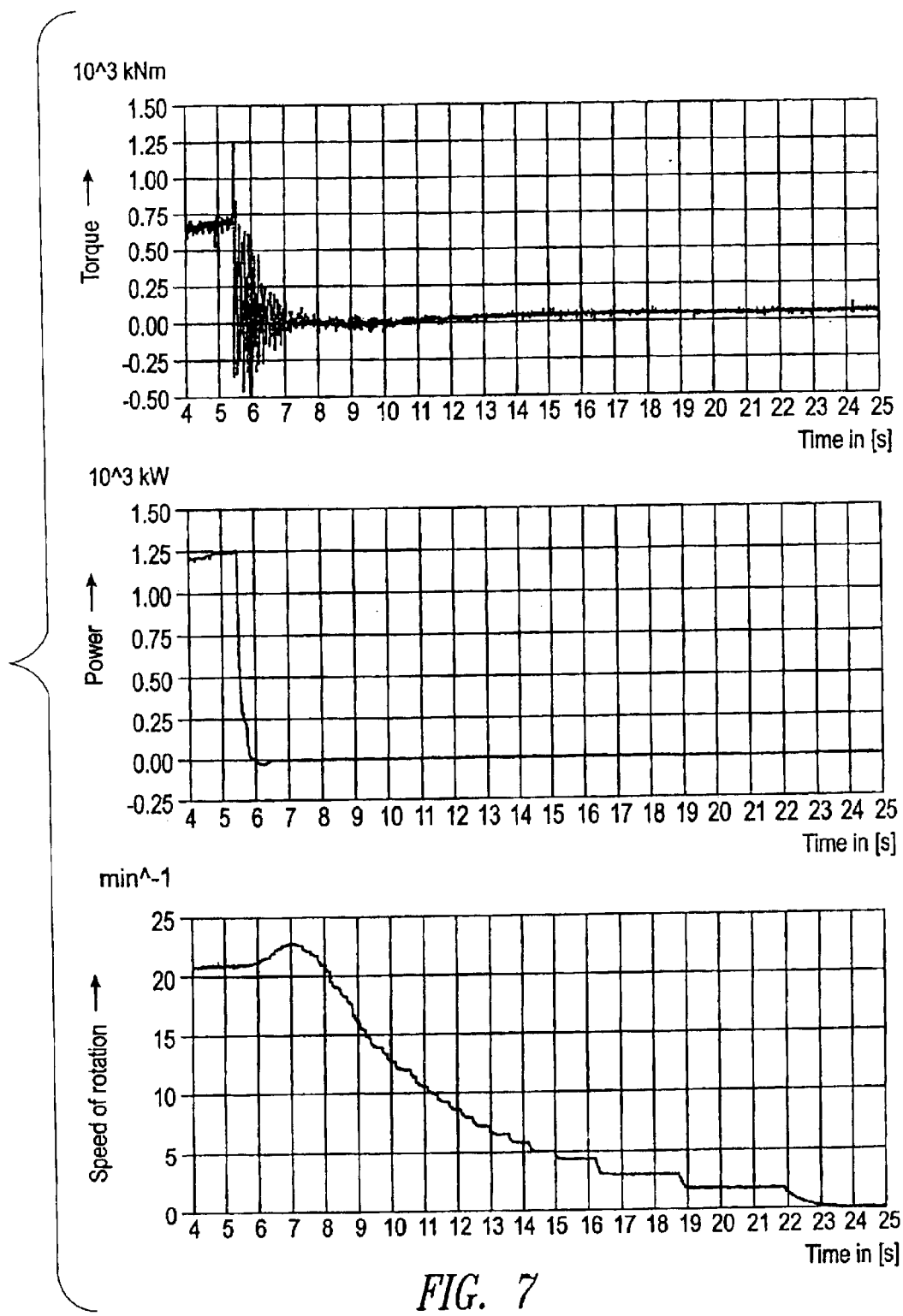
Figure 8:
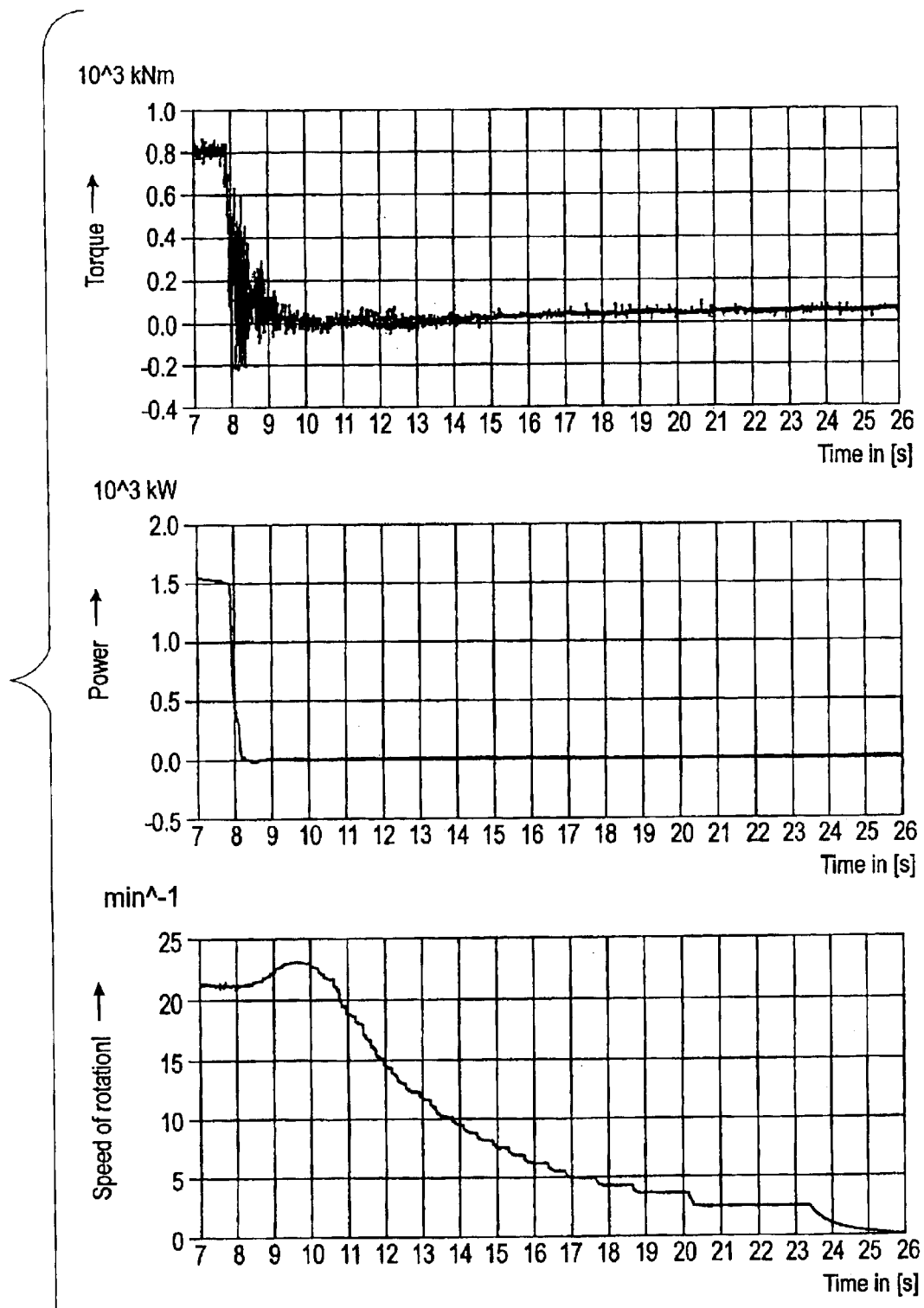

FIG. 1 is a view in cross-section through a wind power installation pod according to the invention, with a synchronous generator according to the invention, FIG. 2 is a view in cross-section through a known wind power installation pod with a known synchronous generator, FIG. 3a is a view of part of a synchronous generator according to the invention, FIG. 3b is a diagrammatic view of the phase conductor distribution, FIG. 3c shows a view of part of a known synchronous generator, FIG. 4a is a perspective view of an arrow-shaped pole head, FIG. 4b is a plan view of an arrow-shaped pole head, FIG. 5 shows a magnetic flux configuration without short-circuit, FIG. 6 shows a magnetic flux configuration with short-circuit, and FIGS. 7 and 8 show measurement recordings in a short-circuit situation with partial load or full load.

DETAILED DESCRIPTION OF THE INVENTION

FIG. 1 shows a part of a wind power installation pod with a rotor 1 which is supported on an axle journal 2 or stub axle. The rotor is connected without a transmission directly to a generator rotor of a synchronous generator. The rotor generator is disposed within a generator stator 3 which is mounted by a flange mounting directly to the axle journal 2. The axle journal 2, like the entire drive train mounted thereon, besides the generator, is carried by the machine carrier 4. Also shown are a rotor hub 5 and a bearing 6.

FIG. 2 shows a wind power installation pod with a known synchronous generator, in which the generator stator 3 is carried by a stator carrier star 7 or spider and the stator carrier star 7 is in turn disposed on the axle journal 2 and is held fast by means of a shearing pin coupling 8.

In the case of a short-circuit, for example at the connecting terminals or also within the stator winding (not shown), very high short-circuit torques are produced in the synchronous generator. Those very high torque peaks which can reach values of up to six to eight times (or more) the rated torque have to be taken into consideration by means of the mechanical structure involved. In the case of the wind power installation of type E-40 from Enercon as shown in FIG. 2, that mechanical structure is embodied by a mechanical safety device in the form of the shearing pin coupling 8. In the case of a generator short-circuit, the pins shear and permit the stator 3 also to rotate about the axle journal 2. That provides that the transmitted torque is limited to a maximum of four times the rated torque. Therefore, in the event of a generator short-circuit, the drive train is guaranteed to be safeguarded.

FIG. 3a is a view in cross-section of a part of a synchronous machine (synchronous generator) according to the invention. In this case the rotor rotates within the stator and the rotor salient-pole machine does not have a damper cage (damper winding) or a short-circuit ring. Shown are a stator plate 12 and a pole core 9 having a pole head 13 according to the invention.

In addition two independent three-phase windings U1, V1, W1 and U2, V2, W2 are disposed in the stator. The power of the generator is thus divided to the two three-phase windings (three-phase systems) so that each three-phase system has to deal with only 50% of the rated power, The two three-phase systems are displaced through an electrical angle of 30% and are thus electrically and mechanically (spatially) isolated from each other. That means however that the reactance $X_d$ is also approximately doubled and thus the short-circuit current is halved. That has the advantage that, in the case of a short-circuit in a three-phase system, only half the short-circuit power can occur. That permits a reduction in the maximum short-circuit moment (short-circuit of two phases, for example U1 and V1), by 50% relative to a system arrangement (state of the art). FIG. 3b is a better overview showing the arrangement of the individual phases of the two different three-phase systems over a larger region of the stator.

FIG. 3c is a view in cross-section of part of a known synchronous generator (synchronous machine in the form of a full-pole machine with damper cage) (type E-40) in which the generator rotor is equipped with a damper cage and the power of the generator is taken up by only one three-phase system U, V, W. Shown are: pole core 9, short-circuit ring 10, damper bars 11, stator plate 12.

The pole shoes or pole heads 13 which are carried on the pole cores 9 of the rotor—as shown in FIG. 3a—are of an arrow-shaped configuration, as shown in FIG. 4.

In this case, the pole head 13—see FIG. 4b—in a plan view onto the surface which is towards the air gap, is in the shape of an arrow. The edge which is the front edge 14 in the direction of movement of the rotor, as identified by an arrow in FIG. 3a, has two edge portions which are arranged in angled relationship with each other and which come together to form a point and which are arranged inclinedly with respect to the direction of movement of the rotor and thus the pole heads 13. The edge portions are arranged at an angle of about 150° with respect to the direction of movement of the rotor. The edge 15 of a pole head 13, which is the trailing edge in the direction of movement of the rotor, also has edge portions which are arranged inclinedly with respect to the direction of movement of the rotor.

FIG. 5 shows a view of the magnetic flux in the generator according to the invention (rotor→stator) without short-circuit. In this case the magnetic flux passes directly from the pole head 3 to the stator 12 uniformly between the grooves.

In the event of a short-circuit—FIG. 6—in a groove—identified here by U2—the magnetic field lines (magnetic flux ($\Phi$)) must deflect. The arrow shape of the pole heads 13 permits deflection within the pole towards the right and towards the left so that the magnetic flux can be distributed to other adjacent groove lands. The deflection of the magnetic flux in the exciter pole in the direction of rotation affords soft dynamic decoupling of the exciter flux with the stator flux within a groove. Per pole width, the short-circuit current flows only in two of a total of six grooves. This dynamic decoupling of the exciter flux still further reduces the short-circuit torque.

FIGS. 7 and 8 show series of time measurements by way of example in respect of rotor torque, power and speed of rotation of a 1.5 MW synchronous generator (type E-66 from Enercon) under partial load (1200 kW) and full load (1500 kW) and with an artificially produced generator short-circuit. The measurements shows that the maximum torque which occurs in all operating states due to a two-phase generator short-circuit is markedly lower than double the rated torque.

As described the combination of various measures—at least two independent three-phase systems; no damper cage, arrow-shaped pole heads—provides the drastic reduction in short-circuit moment, which is of great advantage in particular in the case of a generator for use in wind power installations. In conjunction with the reduction in short-circuit moment, it is also possible to achieve a simplified machine design because the overall stator carrier structure can be simplified considerably in comparison with previous design configurations.

What is claimed is:

1. A wind power installation, comprising:
   a synchronous machine;
   a rotor within the synchronous machine;
   a stator within the synchronous machine, the stator having at least two independent three-phase systems which are electrically isolated from each other; and
   means within the synchronous machine which limit the short-circuit torque which occurs in the case of a short-circuit at the stator winding to a maximum of four times the rated torque.

2. The wind power installation according to claim 1, wherein the rotor does not have a damper cage or damper windings.

3. The wind power installation according to claim 1, wherein the short-circuit torque is limited to less than double the rated torque.

4. The wind power installation according to claim 1, wherein the rotor has pole shoes of a substantially arrow-shaped configuration.

5. The wind power installation according to claim 1, wherein the rotor and the stator are carried by a common axle journal and the stator is mounted by a flange mounting directly to the axle journal.

6. The wind power installation according to claim 1, wherein the stator is held by a carrier, the rotor of the synchronous machine and the carrier are carried by a stationary axle journal, and the carrier and the axle journal are in the form of a structural unit.

7. The wind power installation according to claim 1, wherein the synchronous machine is a synchronous generator and/or the stator carrier and the axle journal are in the form of an integral cast steel component.

8. The wind power installation according to claim 1, wherein no mechanical safety element which releases the stator in the event of a short-circuit is provided between the stator and the axle journal.

9. The wind power installation according to claim 1, wherein the first three-phase system is displaced through an electrical angle of about 30° relative to the second three-phase system.

10. The wind power installation according to claim 1, which produces a power of at least 100 kW.

\* \* \* \* \*